United States Patent
Sprigg et al.

(10) Patent No.: US 9,143,622 B2
(45) Date of Patent: Sep. 22, 2015

(54) PREPAY ACCOUNTS FOR APPLICATIONS, SERVICES AND CONTENT FOR COMMUNICATION DEVICES

(75) Inventors: Stephen A. Sprigg, Poway, CA (US); Brian Minear, San Diego, CA (US); Mitchell B. Oliver, San Diego, CA (US); Richard Wayne Gardner, III, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1242 days.

(21) Appl. No.: 11/357,284

(22) Filed: Feb. 17, 2006

(65) Prior Publication Data

US 2007/0197188 A1 Aug. 23, 2007

(51) Int. Cl.
*H04M 11/00* (2006.01)
*H04M 15/16* (2006.01)
*G06Q 20/16* (2012.01)
*G06Q 20/28* (2012.01)
*G06Q 20/32* (2012.01)
*H04M 15/00* (2006.01)
(Continued)

(52) U.S. Cl.
CPC ............. *H04M 15/16* (2013.01); *G06Q 20/16* (2013.01); *G06Q 20/28* (2013.01); *G06Q 20/32* (2013.01); *G06Q 20/322* (2013.01); *H04M 15/705* (2013.01); *H04M 15/71* (2013.01); *H04M 15/7655* (2013.01); *H04M 15/77* (2013.01); *H04M 15/772* (2013.01); *H04M 15/882* (2013.01); *H04M 15/888* (2013.01); *H04M 17/20* (2013.01); *H04W 4/24* (2013.01); *H04M 2215/0124* (2013.01); *H04M 2215/0144* (2013.01); *H04M 2215/204* (2013.01); *H04M 2215/2006* (2013.01); *H04M 2215/2026* (2013.01); *H04M 2215/7009* (2013.01); *H04M 2215/7018* (2013.01); *H04M 2215/725* (2013.01); *H04M 2215/7254* (2013.01); *H04M 2215/7263* (2013.01)

(58) Field of Classification Search
USPC .............. 455/406, 407, 405, 408; 705/30–50; 379/114.01–132; 725/1–8
See application file for complete search history.

(56) References Cited

U.S. PATENT DOCUMENTS

| 628,294 A | 7/1899 | Ira |
| 4,156,903 A | 5/1979 | Barton et al. |

(Continued)

FOREIGN PATENT DOCUMENTS

| CA | 2267549 A1 | 9/2000 |
| CA | 2363220 A1 | 5/2003 |

(Continued)

OTHER PUBLICATIONS

International Search Report—PCT/US07/062249, International Search Authority—European Patent Office, Jun. 12, 2007.

(Continued)

*Primary Examiner* — Erika A Washington
(74) *Attorney, Agent, or Firm* — Fariba Yadegr-Bandari

(57) ABSTRACT

A system and method for managing a billing account including a client device, a transceiver, logic configured to establish at least one primary account wherein the at least one primary account represents periodic fees that are charged to the billing account on a periodic basis; and logic configured to establish at least one secondary account wherein the at least one secondary account represents an amount of prepaid service that is available for the billing account.

32 Claims, 5 Drawing Sheets

(51) Int. Cl.
*H04M 17/00* (2006.01)
*H04W 4/24* (2009.01)

(56) References Cited

U.S. PATENT DOCUMENTS

| | | |
|---|---|---|
| 4,975,942 A | 12/1990 | Zebryk |
| 5,005,122 A | 4/1991 | Griffin et al. |
| 5,329,619 A | 7/1994 | Page et al. |
| 5,564,070 A | 10/1996 | Want et al. |
| 5,608,781 A | 3/1997 | Seiderman |
| 5,619,247 A | 4/1997 | Russo |
| 5,634,012 A | 5/1997 | Stefik et al. |
| 5,666,293 A | 9/1997 | Metz et al. |
| 5,666,397 A | 9/1997 | Lamons et al. |
| 5,761,485 A | 6/1998 | Munyan |
| 5,812,988 A | 9/1998 | Sandretto |
| 5,845,267 A | 12/1998 | Ronen |
| 5,852,812 A | 12/1998 | Reeder |
| 5,857,201 A | 1/1999 | Wright, Jr. et al. |
| 5,907,837 A | 5/1999 | Ferrel et al. |
| 5,940,752 A | 8/1999 | Henrick |
| 5,956,034 A | 9/1999 | Sachs et al. |
| 5,970,490 A | 10/1999 | Morgenstern |
| 5,986,690 A | 11/1999 | Hendricks |
| 6,035,281 A | 3/2000 | Crosskey et al. |
| 6,047,051 A | 4/2000 | Ginzboorg et al. |
| 6,088,717 A | 7/2000 | Reed et al. |
| 6,141,404 A | 10/2000 | Westerlage et al. |
| 6,151,606 A | 11/2000 | Mendez |
| 6,181,704 B1 | 1/2001 | Drottar et al. |
| 6,185,198 B1 | 2/2001 | LaDue |
| 6,185,683 B1 | 2/2001 | Ginter et al. |
| 6,202,051 B1 | 3/2001 | Woolston |
| 6,226,618 B1 | 5/2001 | Downs et al. |
| 6,230,168 B1 | 5/2001 | Unger et al. |
| 6,230,269 B1 | 5/2001 | Spies et al. |
| 6,253,189 B1 | 6/2001 | Feezell et al. |
| 6,253,239 B1 | 6/2001 | Shklar et al. |
| 6,253,326 B1 | 6/2001 | Lincke et al. |
| 6,263,326 B1 | 7/2001 | Chandra |
| 6,263,362 B1 | 7/2001 | Donoho et al. |
| 6,266,401 B1 | 7/2001 | Marchbanks et al. |
| 6,269,157 B1 | 7/2001 | Coyle |
| 6,282,294 B1 | 8/2001 | Deo et al. |
| 6,311,223 B1 | 10/2001 | Bodin et al. |
| 6,321,078 B1 | 11/2001 | Menelli et al. |
| 6,324,565 B1 | 11/2001 | Holt, III |
| 6,327,574 B1 | 12/2001 | Kramer et al. |
| 6,334,114 B1 | 12/2001 | Jacobs et al. |
| 6,334,116 B1 | 12/2001 | Ganesan et al. |
| 6,336,137 B1 | 1/2002 | Lee et al. |
| 6,343,318 B1 | 1/2002 | Hawkins et al. |
| 6,366,893 B2 | 4/2002 | Hannula et al. |
| 6,381,325 B1 | 4/2002 | Hanson |
| 6,389,464 B1 | 5/2002 | Krishnamurthy et al. |
| 6,427,076 B2 | 7/2002 | Skog |
| 6,434,535 B1 | 8/2002 | Kupka et al. |
| 6,453,160 B1 | 9/2002 | Thomas et al. |
| 6,460,076 B1 | 10/2002 | Srinivasan |
| 6,463,534 B1 | 10/2002 | Geiger et al. |
| 6,493,722 B1 | 12/2002 | Daleen et al. |
| 6,535,726 B1 | 3/2003 | Johnson |
| 6,549,770 B1 | 4/2003 | Marran |
| 6,597,903 B1 | 7/2003 | Dahm et al. |
| 6,598,026 B1 | 7/2003 | Ojha et al. |
| 6,606,744 B1 | 8/2003 | Mikurak |
| 6,622,017 B1 | 9/2003 | Hoffman |
| 6,628,934 B2 | 9/2003 | Rosenberg et al. |
| 6,665,711 B1 | 12/2003 | Boyle et al. |
| 6,683,941 B2 | 1/2004 | Brown et al. |
| 6,704,716 B1 | 3/2004 | Force |
| 6,721,716 B1 | 4/2004 | Gross |
| 6,741,980 B1 | 5/2004 | Langseth et al. |
| 6,742,043 B1 | 5/2004 | Moussa et al. |
| 6,754,320 B2 | 6/2004 | Daase et al. |
| 6,757,710 B2 | 6/2004 | Reed |
| 6,792,271 B1 | 9/2004 | Sherman et al. |
| 6,792,280 B1 | 9/2004 | Hori et al. |
| 6,816,721 B1 | 11/2004 | Rudisill |
| 6,820,121 B1 | 11/2004 | Callis et al. |
| 6,857,067 B2 | 2/2005 | Edelman |
| 6,873,936 B2 | 3/2005 | Reel et al. |
| 6,880,750 B2 | 4/2005 | Pentel |
| 6,883,142 B2 | 4/2005 | Shimamoto et al. |
| 6,928,441 B2 | 8/2005 | Haegele |
| 6,937,996 B1 | 8/2005 | Forsythe et al. |
| 6,941,139 B1 | 9/2005 | Shupe et al. |
| 6,941,270 B1 | 9/2005 | Hannula |
| 6,954,793 B2 | 10/2005 | Ramaswamy et al. |
| 6,955,883 B2 | 10/2005 | Margus et al. |
| 6,957,793 B2 | 10/2005 | Gautier et al. |
| 6,965,883 B2 | 11/2005 | Xu et al. |
| 6,978,273 B1 | 12/2005 | Bonneau et al. |
| 6,985,882 B1 | 1/2006 | Del Sesto |
| 6,996,537 B2 | 2/2006 | Minear et al. |
| 7,010,303 B2 | 3/2006 | Lewis et al. |
| 7,010,500 B2 | 3/2006 | Aarnio |
| 7,013,289 B2 | 3/2006 | Horn et al. |
| 7,020,688 B2 | 3/2006 | Sykes, Jr. |
| 7,039,389 B2 | 5/2006 | Johnson, Jr. |
| 7,043,447 B2 | 5/2006 | Hughes et al. |
| 7,047,405 B2 | 5/2006 | Mauro |
| 7,068,680 B1 | 6/2006 | Kaltenmark et al. |
| 7,099,891 B2 | 8/2006 | Harris et al. |
| 7,113,766 B2 | 9/2006 | Horel et al. |
| 7,117,504 B2 | 10/2006 | Smith et al. |
| 7,155,205 B2 | 12/2006 | Cerami et al. |
| 7,177,837 B2 | 2/2007 | Pegaz-Paquet et al. |
| 7,184,747 B2 | 2/2007 | Bogat |
| 7,200,566 B1 | 4/2007 | Moore et al. |
| 7,206,842 B2 | 4/2007 | Nainani et al. |
| 7,218,917 B2 | 5/2007 | Pradhan et al. |
| 7,228,333 B1 | 6/2007 | Smith |
| 7,233,790 B2 | 6/2007 | Kjellberg et al. |
| 7,260,194 B1 * | 8/2007 | Meyers et al. ........... 379/114.15 |
| 7,269,654 B2 | 9/2007 | Srinivas |
| 7,278,164 B2 | 10/2007 | Raiz et al. |
| 7,286,655 B2 * | 10/2007 | Voorman et al. ........... 379/114.2 |
| 7,293,099 B1 | 11/2007 | Kalajan |
| 7,334,025 B2 | 2/2008 | Kuriya |
| 7,362,745 B1 * | 4/2008 | Cope et al. .................. 370/352 |
| 7,370,120 B2 | 5/2008 | Kirsch et al. |
| 7,404,148 B2 | 7/2008 | Lincke et al. |
| 7,415,439 B2 | 8/2008 | Kontio et al. |
| 7,436,816 B2 | 10/2008 | Mehta et al. |
| 7,444,411 B2 | 10/2008 | Sung et al. |
| 7,467,198 B2 | 12/2008 | Goodman et al. |
| 7,490,045 B1 | 2/2009 | Flores et al. |
| 7,526,450 B2 | 4/2009 | Hughes et al. |
| 7,574,377 B2 | 8/2009 | Carapelli |
| 7,577,616 B2 | 8/2009 | Zhu |
| 7,583,953 B2 * | 9/2009 | Choi et al. .................... 455/405 |
| 7,660,755 B2 * | 2/2010 | Amato et al. .................. 705/34 |
| 7,711,680 B2 | 5/2010 | Barnes-Leon et al. |
| 7,752,217 B2 | 7/2010 | Sawashima et al. |
| 7,894,803 B2 | 2/2011 | Kamada |
| 7,904,528 B2 | 3/2011 | Zilliacus et al. |
| 7,907,937 B2 * | 3/2011 | Engelhart ..................... 455/411 |
| 8,028,056 B1 | 9/2011 | Krishna et al. |
| 8,150,736 B2 | 4/2012 | Horn et al. |
| 8,489,470 B2 | 7/2013 | Kahlon et al. |
| 2001/0013020 A1 | 8/2001 | Yoshida et al. |
| 2001/0032254 A1 | 10/2001 | Hawkins |
| 2001/0034686 A1 | 10/2001 | Eder |
| 2001/0036271 A1 | 11/2001 | Javed |
| 2001/0037304 A1 | 11/2001 | Paiz |
| 2001/0056362 A1 | 12/2001 | Hanagan et al. |
| 2002/0002603 A1 | 1/2002 | Vange |
| 2002/0004935 A1 | 1/2002 | Huotari et al. |
| 2002/0019764 A1 | 2/2002 | Mascarenhas |
| 2002/0022472 A1 | 2/2002 | Watler et al. |
| 2002/0022971 A1 | 2/2002 | Tanaka et al. |
| 2002/0029197 A1 | 3/2002 | Kailamaki et al. |
| 2002/0029200 A1 | 3/2002 | Dulin et al. |

(56) References Cited

U.S. PATENT DOCUMENTS

| | | |
|---|---|---|
| 2002/0035688 A1 | 3/2002 | Kutaragi et al. |
| 2002/0035699 A1 | 3/2002 | Crosbie |
| 2002/0049717 A1 | 4/2002 | Routtenberg et al. |
| 2002/0052754 A1 | 5/2002 | Joyce et al. |
| 2002/0052968 A1 | 5/2002 | Bonefas et al. |
| 2002/0062290 A1 | 5/2002 | Ricci |
| 2002/0069176 A1 | 6/2002 | Newman |
| 2002/0069244 A1 | 6/2002 | Blair et al. |
| 2002/0069263 A1 | 6/2002 | Sears et al. |
| 2002/0071559 A1 | 6/2002 | Christensen et al. |
| 2002/0083006 A1 | 6/2002 | Headings et al. |
| 2002/0083050 A1 | 6/2002 | Liu et al. |
| 2002/0107706 A1 | 8/2002 | Oliver et al. |
| 2002/0107795 A1 | 8/2002 | Minear et al. |
| 2002/0107809 A1 | 8/2002 | Biddle et al. |
| 2002/0109706 A1 | 8/2002 | Lincke et al. |
| 2002/0111904 A1 | 8/2002 | Gruber et al. |
| 2002/0128908 A1 | 9/2002 | Levin et al. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0165822 A1 | 11/2002 | Makipaa |
| 2002/0176553 A1* | 11/2002 | Aschir .................. 379/114.2 |
| 2002/0194143 A1 | 12/2002 | Banerjee et al. |
| 2003/0005136 A1 | 1/2003 | Eun |
| 2003/0023550 A1 | 1/2003 | Lee |
| 2003/0028903 A1 | 2/2003 | Hofrichter et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1 | 4/2003 | Schiff et al. |
| 2003/0078844 A1* | 4/2003 | Takatori et al. ................. 705/17 |
| 2003/0078886 A1 | 4/2003 | Minear et al. |
| 2003/0078895 A1 | 4/2003 | MacKay |
| 2003/0083973 A1 | 5/2003 | Horsfall |
| 2003/0083991 A1 | 5/2003 | Kikinis |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1 | 6/2003 | Nix et al. |
| 2003/0110213 A1 | 6/2003 | Munetsugu et al. |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0208444 A1 | 11/2003 | Sauer |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0006517 A1 | 1/2004 | Takatori |
| 2004/0015413 A1 | 1/2004 | Abu-Hejleh et al. |
| 2004/0015562 A1 | 1/2004 | Harper et al. |
| 2004/0030601 A1 | 2/2004 | Pond et al. |
| 2004/0043753 A1 | 3/2004 | Wake et al. |
| 2004/0044623 A1 | 3/2004 | Wake et al. |
| 2004/0137890 A1 | 7/2004 | Kalke |
| 2004/0139012 A1* | 7/2004 | Koskinen et al. ............... 705/40 |
| 2004/0181591 A1 | 9/2004 | Yu et al. |
| 2004/0267630 A1 | 12/2004 | Au et al. |
| 2005/0086348 A1 | 4/2005 | Balassanian |
| 2005/0090258 A1 | 4/2005 | Coppinger et al. |
| 2005/0113092 A1 | 5/2005 | Coppinger et al. |
| 2005/0114155 A1 | 5/2005 | Hodges et al. |
| 2005/0125315 A1* | 6/2005 | Munoz et al. .................. 705/30 |
| 2005/0132049 A1 | 6/2005 | Inoue et al. |
| 2005/0148319 A1 | 7/2005 | Himeno |
| 2005/0192878 A1 | 9/2005 | Minear et al. |
| 2005/0289047 A1 | 12/2005 | Oliver et al. |
| 2006/0014535 A1 | 1/2006 | Walker et al. |
| 2006/0080232 A1 | 4/2006 | Epps |
| 2006/0143119 A1 | 6/2006 | Krueger et al. |
| 2006/0173758 A1 | 8/2006 | Minear et al. |
| 2006/0235931 A1 | 10/2006 | Ruthe et al. |
| 2006/0253350 A1 | 11/2006 | Falkenhain et al. |
| 2006/0270386 A1 | 11/2006 | Yu et al. |
| 2006/0271449 A1 | 11/2006 | Oliver et al. |
| 2007/0003034 A1* | 1/2007 | Schultz et al. ............ 379/114.01 |
| 2007/0038703 A1 | 2/2007 | Tendjoukian et al. |
| 2007/0066279 A1 | 3/2007 | Silverbrook et al. |
| 2007/0083464 A1* | 4/2007 | Cordero Torres et al. ...... 705/39 |
| 2007/0123229 A1 | 5/2007 | Pousti |
| 2007/0169163 A1 | 7/2007 | Morio et al. |
| 2007/0174308 A1 | 7/2007 | Rausch |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1459183 A | 11/2003 |
| EP | 0780802 A2 | 6/1997 |
| EP | 0895148 A1 | 2/1999 |
| EP | 1026610 A2 | 8/2000 |
| EP | 1026853 A1 | 8/2000 |
| EP | 1033652 | 9/2000 |
| EP | 1047030 A2 | 10/2000 |
| EP | 1102191 A2 | 5/2001 |
| EP | 1122967 A2 | 8/2001 |
| EP | 1162807 A2 | 12/2001 |
| EP | 1204054 A2 | 5/2002 |
| EP | 1403797 A1 | 3/2004 |
| EP | 1404100 | 3/2004 |
| EP | 1414185 A2 | 4/2004 |
| FR | 2775550 A1 | 9/1999 |
| GB | 2349548 A | 11/2000 |
| JP | 07044261 | 2/1995 |
| JP | 07319691 A | 12/1995 |
| JP | 9319573 A | 12/1997 |
| JP | 1066050 | 3/1998 |
| JP | 10140283 A | 5/1998 |
| JP | 10260873 A | 9/1998 |
| JP | 10262059 A | 9/1998 |
| JP | 11053185 A | 2/1999 |
| JP | 11055252 A | 2/1999 |
| JP | 11069017 A | 3/1999 |
| JP | 11126188 A | 5/1999 |
| JP | 200056967 | 2/2000 |
| JP | 2000078129 A | 3/2000 |
| JP | 2000357196 A | 12/2000 |
| JP | 2001195451 A | 7/2001 |
| JP | 2001202434 A | 7/2001 |
| JP | 2001243382 A | 9/2001 |
| JP | 2001250069 A | 9/2001 |
| JP | 2001265938 | 9/2001 |
| JP | 2001268623 A | 9/2001 |
| JP | 2001312324 A | 11/2001 |
| JP | 2001312666 A | 11/2001 |
| JP | 2001319168 A | 11/2001 |
| JP | 2001320509 A | 11/2001 |
| JP | 2001325234 | 11/2001 |
| JP | 2001352583 | 12/2001 |
| JP | 2002007839 A | 1/2002 |
| JP | 2002015160 A | 1/2002 |
| JP | 2002027151 | 1/2002 |
| JP | 2002091850 A | 3/2002 |
| JP | 2002093361 A | 3/2002 |
| JP | 2002094450 A | 3/2002 |
| JP | 200299441 | 4/2002 |
| JP | 2002099289 A | 4/2002 |
| JP | 2002101315 A | 4/2002 |
| JP | 2002109395 A | 4/2002 |
| JP | 2002132367 | 5/2002 |
| JP | 2002133316 A | 5/2002 |
| JP | 2002163258 | 6/2002 |
| JP | 2002163467 A | 6/2002 |
| JP | 2002175387 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002353885 A | 12/2002 |

(56) References Cited

FOREIGN PATENT DOCUMENTS

| | | |
|---|---|---|
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2006505966 A | 2/2006 |
| JP | 2007527570 A | 9/2007 |
| JP | 2008514743 A | 5/2008 |
| JP | 2010178027 A | 8/2010 |
| KR | 200072521 | 12/2000 |
| KR | 20010078968 | 8/2001 |
| KR | 20020039648 | 5/2002 |
| KR | 20030042660 A | 6/2003 |
| KR | 1020030050565 | 6/2003 |
| KR | 20030078446 | 10/2003 |
| RU | 2165679 C1 | 4/2001 |
| RU | 2191482 C1 | 10/2002 |
| RU | 2212057 | 9/2003 |
| TW | 161301 | 6/1991 |
| TW | 388021 B | 4/2000 |
| TW | 466858 B | 12/2001 |
| TW | 499645 B | 8/2002 |
| WO | 9308545 A1 | 4/1993 |
| WO | 9726739 A1 | 7/1997 |
| WO | 9745814 A1 | 12/1997 |
| WO | 9821676 | 5/1998 |
| WO | 9931610 A1 | 6/1999 |
| WO | 9941861 A1 | 8/1999 |
| WO | 9952077 A1 | 10/1999 |
| WO | 0002112 A2 | 1/2000 |
| WO | 0031672 A1 | 6/2000 |
| WO | 0043962 A1 | 7/2000 |
| WO | 0056033 A1 | 9/2000 |
| WO | 0079451 A1 | 12/2000 |
| WO | 0143390 A2 | 6/2001 |
| WO | 0149048 A1 | 7/2001 |
| WO | WO0150305 | 7/2001 |
| WO | 0163532 | 8/2001 |
| WO | 0163900 A1 | 8/2001 |
| WO | 0169891 A1 | 9/2001 |
| WO | 0197104 A1 | 12/2001 |
| WO | 0203219 A1 | 1/2002 |
| WO | 0231718 A1 | 4/2002 |
| WO | 0244892 | 6/2002 |
| WO | 02063536 A2 | 8/2002 |
| WO | 02063537 A2 | 8/2002 |
| WO | 02067600 A1 | 8/2002 |
| WO | 02073934 A2 | 9/2002 |
| WO | 02093361 A1 | 11/2002 |
| WO | 02103459 A2 | 12/2002 |
| WO | 03017171 A1 | 2/2003 |
| WO | 03030559 A2 | 4/2003 |
| WO | 03032618 A1 | 4/2003 |
| WO | 03050743 A1 | 6/2003 |
| WO | 03075584 A2 | 9/2003 |
| WO | 03079256 A1 | 9/2003 |
| WO | 03085943 A1 | 10/2003 |
| WO | 2004003708 A2 | 1/2004 |
| WO | 2004021131 A2 | 3/2004 |
| WO | 2004021133 A2 | 3/2004 |
| WO | 2004082245 A2 | 9/2004 |
| WO | 2004084526 A2 | 9/2004 |
| WO | 2005004456 A1 | 1/2005 |
| WO | 2005008383 A2 | 1/2005 |
| WO | 2005020027 A2 | 3/2005 |
| WO | 2005069917 | 8/2005 |
| WO | 2005109931 A1 | 11/2005 |
| WO | 2006130539 A2 | 12/2006 |

OTHER PUBLICATIONS

Written Opinion—PCT/US07/062249, International Search Authority—European Patent Office, Jun. 12, 2007.

Anonymous, "BPM In Action: iUNIVERSE," Intelligent Enterprise, San Mateo, May 15, 2004, vol. 7, Issue 8, 2 pages (recovered from ProQuest on Jun. 5, 2009).

Anonymous: "BREW TM Application Note: Developing Brew Applications for Devices with RUIM Units", May 14, 2005, pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.

Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 4, 2012].

Arar, Yardena, "Download apps to a phone," PC World, Jun. 2002, v20i6 pp. 64, Proquest #120993020 3 pgs.

Atsuyuki Morishima, "Efficient Construction of Materialized XML Views With Silkroute", IPSJ SIG Notes, Japan, Information Processing Society of Japan, Ju. 17, 2001, vol. 2001, No. 70, pp. 421-428.

Business Wire, "Informix Announces Key Customer Wins in Fourth Quarter; Leading Companies and Government Entities in Key Markets Around the World Respond to Informer's Technology Strategy", Business/Technology Editors. Business Wire. New York: Jan. 27, 1999, p. 1-8.

Butrico M A et al: "Gold Rush: Mobile Transaction Middleware With Java-Object Replication" Conference on Object-Oriented Technologies, (Jun. 16, 1997), pp. 91-101.

Classified Ad 3—No Title, New York Daily Times (1851-1857); Nov. 15, 1853; ProQuest Historical Newspapers: The New York Times (1851-2008) p. 4.

Classified Ad 74—No Title. Chicago Daily Tribune (1923-1963); Oct. 11, 1959; ProQuest Historical Newspapers: Chicago Tribune (1849-1989) p. G34.

"Ellipsus' Mobile Aplication Provisioning System", Internet Citation, Dec. 2, 2001, XP002266188, Retrieved from the Internet: URL: web.archive.orgfwww.ellipsus.com [retrieved on Jan. 7, 2004].

EPO: "Notice From the European Patent Office Dated Oct. 1, 2007 Concerning Business Methods", Journal of the European Patent Office—vol. 30, No. 11, Nov. 1, 2007, pp. 592-593, XP007905525, ISSN: 0170-9291.

Floyd R, et al., "Mobile Web Access Using ENetwork Web Express", IEEE Personal Communications, IEEE Communications Society, US, vol. 5, No. 5, Oct. 1, 1998, pp. 47-52, XP000786616.

Fujii, H. "Brew application, flexibility in development comparable to PCs, powerful in enterprise system cooperation of cellular phones," Solution IT, vol. 14, No. 11, Japan, RIC Telecom, Nov. 1, 2002, pp. 22-24.

Goldenberg-Hart, Diane, "A Glossary of Selected Internet and Computing Terms," Yale University Library, Jun. 1996. Retrieved from http://www.library.yale.edu/ref/internet/intgloss.htm.

"How can wireless models help my business?", Computer Weekly, Dec. 2, 2003; p. 1-5, Available from: Business Source Complete, Ipswich, MA. Accessed Jul. 1, 2013.

M2 Presswire. Convergys: Genie Mobile chooses Geneva Billing software, continuing the momentum of the merger between Convergys and Geneva Technology. Coventry: Jun. 1, 2001, p. 1.

McAuliffe W., "Broadband heading for move to metered billing", New Media Age, Apr. 29, 2004; p. 1, Available from: Business Source Complete, Ipswich, MA. Accessed Jul. 1, 2013.

No Author, "AvantGo 4.0 Powers Wireless Applications and Services," Customer Inter©ction Solutions, May 2001, vol. 19, Issue 11, p. 71.

No Author, "Sony Pictures to Sell Movies via Internet," Jul. 9, 2001, Source: Japan Computer Industry Scan.

Oommen P., "Over the Air Handset Management," Emerging Technologies Symposium, Broadband, Wireless Internet Access, 2000,

(56) References Cited

OTHER PUBLICATIONS

IEEE Apr. 10-11, 2000, Piscataway, NJ, USA, IEEE, Apr. 10, 2000, pp. 1-4, XP010538894, ISBN: 0-7803-6364-7.

PR Newswire. China Unicom Selects Qualcomm's BREW Solution as Its Platform to Launch Wireless Data Applications. New York, Aug. 26, 2002, p. 1.

PR Newswire, "Diebold Teams with Health System Services to Offer a Complete Distribution Package for Pharmacy Medication and Supplies". New York: May 28, 1998. pp. 1-3.

Qualcomm; "Binary Runtime Environment for Wireless, BREW Application note: Developing BREW Applications for Devices with RUIM Units" (Online) Jan. 10, 2005, pp. 1-11, XP002410586 San Diego Retrieved from the internet: URL:http://brew.qualcomm.com/brew_bnry/pdf/developer/resources/ds/Dev_BREW_Apps.pdf> [retrieved on Dec. 6, 2006].

Qualcomm Incorporated, "Brew Distribution System (BDS) Overview" Internet Citation, (Online) 2003, Retrieved from the Internet: URL: http://www.wirelessknowledge.com/brew/images/about/pdf/bds.pdf> (retrieved on Dec. 6, 2006), pp. 1-17.

Rigdon, Joan E., "CyberSource Begins to Offer Software of Symantec and Others on the Internet," Wall Street Journal, Jan. 31, 1995.

Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

SYNCML Consortium: "SYNCML Sync Protocol, Version 1.0" (Dec. 17, 2000), Chapters 1, 2, 5-8.

SYNCML Consortium: "SYNCML Sync Protocol, Version 1.0.1" (Jun. 15, 2001).

Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.

USA Group Selects Click-N-Done for Electronic Bill Presentment and Payment; Software Will Support Online Presentment and Payment for Education Loan Borrowers Business Editors, Internet Writers. Business Wire. New York: Apr. 24, 2000. p. 1.

"SYNCML Representation Protocol, Version 1.0" SYNCML Representation Protocol, (Dec. 7, 2000), p. 1-104, Chapters 1-4.

\* cited by examiner

PREPAY ACCOUNTS FOR APPLICATIONS, SERVICES AND CONTENT FOR COMMUNICATION DEVICES

FIELD

The present invention generally relates towards a system and method using prepay accounts for applications, services and content for communication devices. More particularly, the present invention relates to prepay account management for both wireless and non-wireless devices.

DESCRIPTION OF THE RELATED ART

Advances in technology have resulted in smaller and more powerful personal computing devices. For example, there are a variety of portable personal computing devices, including wireless computing devices, such as portable wireless telephones, laptops, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

However, these smaller and more powerful personal computing devices are typically severely resource constrained. For example, the screen size, amount of available memory and file system space, amount of input and output capabilities and processing capability may each be limited by the small size of the device. Due to severe resource constraints, it is often typically desirable, for example, to maintain a limited size and quantity of software applications and other information residing on such remote personal computing devices (client devices).

Some of the personal computing devices utilize an application programming interface (API) or application programming interfaces (APIs), sometimes referred to as runtime environments and software platforms, that are installed onto their local computer platform and which are used, for example, to simplify operations of such devices, such as by providing generalized calls for device specific resources. An API is a set of routines used by an application program to direct the performance of procedures used by the computer's operating system.

Further, some APIs are also known to provide software developers the ability to create software applications that are fully executable on such devices. In addition, some of such APIs are known to be operationally located between the computing device system software and the software applications such that the computing device system software and the software applications such that the computing device computing functionality is made available to the software application without requiring the software developer to have the specific computing device system source code. Further, some APIs are known to provide mechanisms for secure communications between such personal devices (i.e., clients) and remote devices (i.e., servers) using secure, cryptographic information.

Examples of such APIs, some of which are discussed in more detail below, include versions of the Binary Runtime Environment for Wireless® (BREW®) developed by QUALCOMM, Inc., of San Diego, Calif. BREW® can operate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security, and application distribution functionality, and the client performs, for example, application execution, security and user interface functionality.

In current wireless server-client systems, information can be transmitted to the wireless devices, such as a cellular telephone, by short messaging service (SMS), or other over-the-air methods known in the art. SMS messages result only in a disruptive notification (e.g., popup window) to the user before the message goes to a generic inbox, or else the message may be temporarily displayed before being deleted. Conventional SMS messages do not take advantage of the advances in the enhanced computing and display capabilities of the wireless clients.

The foregoing description of the related art is merely intended to provide an overview of some of the known uses of APIs and as an introduction to the BREW® platform, which can used in various embodiments of the invention. However, the invention is not to be construed as being limited to a specific implementation, operating platform or environment.

SUMMARY OF THE INVENTION

Exemplary embodiments of the present invention are directed towards a system and method using prepay accounts for applications, services and content for wireless and wired communication devices.

At least one embodiment includes a system for managing a billing account includes a client device including a transceiver; logic configured to establish at least one primary account wherein the at least one primary account represents periodic fees that are charged to the billing account on a periodic basis; and logic configured to establish at least one secondary account wherein the at least one secondary account represents an amount of prepaid service that is available for the billing account.

Another embodiment includes a method for billing prepay accounts including establishing at least one primary account wherein the at least one primary account represents periodic fees that are charged to the billing account on a periodic basis; and establishing at least one secondary account wherein the at least one secondary account represents an amount of prepaid service that is available for the billing account.

Another embodiment includes a wireless client device, including a transceiver; a user interface; and a billing manager for managing the at least one primary account and the at least one secondary account and wherein the at least one secondary account represents an amount of prepaid service.

Another embodiment includes a computer-readable medium on which is stored a computer program for managing a billing account, the computer program including instructions which, upon being executed by at least one computing device, causes the computing device to perform the process of: establishing at least one primary account wherein the at least one primary account represents periodic fees that are charged to the billing account on a periodic basis; and establishing at least one secondary account wherein the at least one secondary account represents an amount of prepaid service that is available for the billing account.

BRIEF DESCRIPTION OF THE DRAWINGS

A more complete appreciation of embodiments of the invention and many of the attendant advantages thereof will be readily obtained as the same becomes better understood by the reference to the following detailed description when considered in connection with the accompanying drawings which are presented solely for illustration and not limitation of the invention, and in which.

DETAILED DESCRIPTION OF THE INVENTION

Various embodiments of the invention are disclosed in the following description and related drawings directed to specific embodiments of the invention. Alternate embodiments may be devised without departing from the spirit and scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on a computing device. One such runtime environment (API) is the Binary Runtime Environment for Wireless® (BREW®) software previously discussed. However, one or more embodiments of the invention can be used with other types of runtime environments (APIS) that, for example, operate to control the execution of applications on wireless client computing devices.

Figure 1:
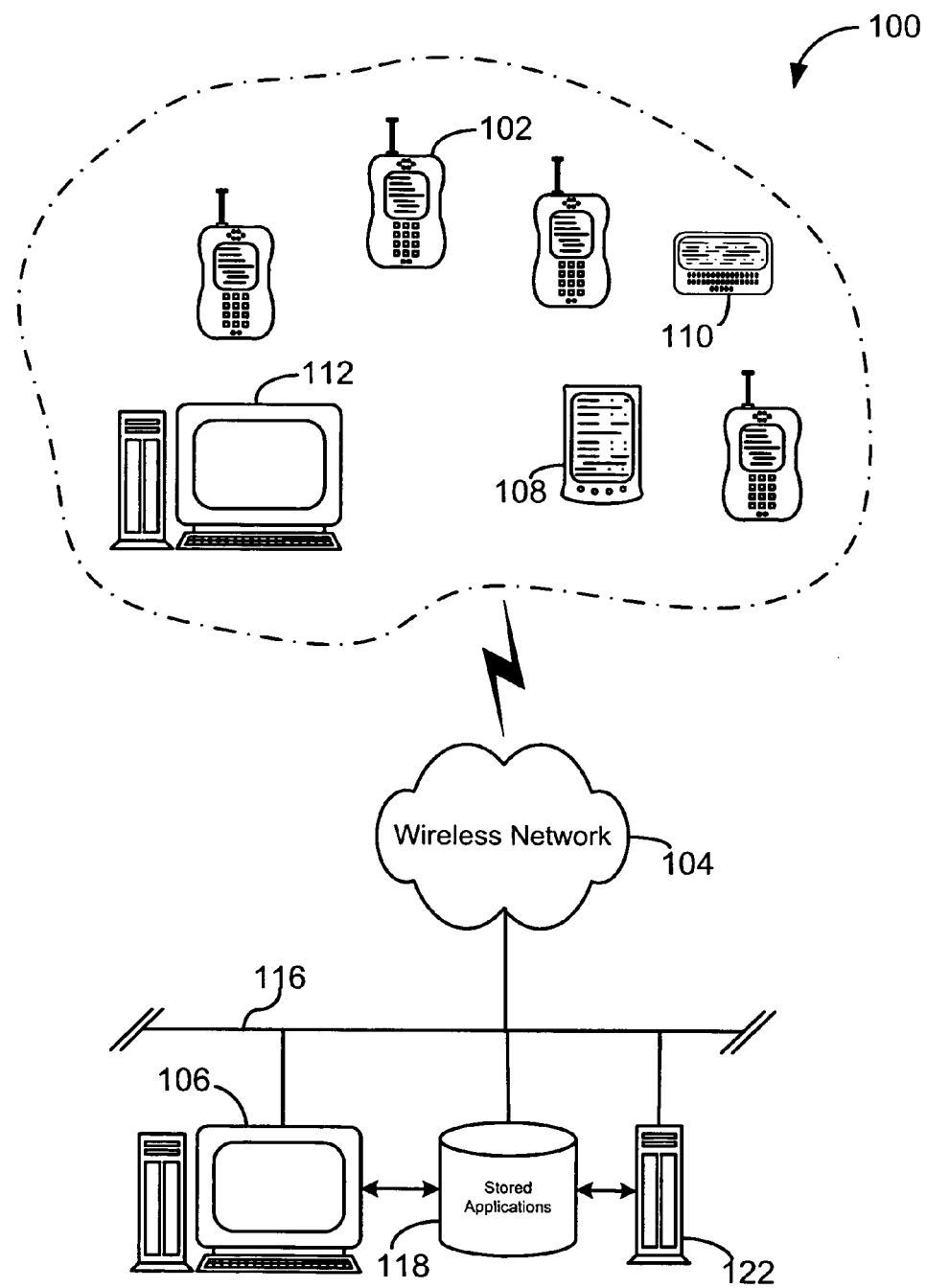
FIG. 1 is a diagram of a wireless network architecture that supports client devices and servers in accordance with at least one embodiment of the invention.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one application download server 106 that selectively transmits software applications and components to wireless devices across a wireless communication portal or other data access to the wireless network 104. As shown in FIG. 1, the wireless (client) device can be a cellular telephone 102, a personal digital assistant 108, a pager 110, which is shown here as a two-way text pager, or even a separate computer platform 112 that has a wireless communication portal. The various embodiments of the invention can thus be realized on any form of client device including a wireless communication portal of having wireless communication capabilities, including without limitation, wireless modems, PCMCIA cards, personal computers, access terminals, telephones, or any combination or sub-combination thereof.

The application download server 106 is shown here on a network 116 with other computer elements in communication with the wireless network 104. There can be a stand-alone server 122, and each server can provide separate services and processes to the client devices 102, 108, 110 and 112 across the wireless network 104. There is preferably also at least one stored application database 118 that holds the software applications that are downloadable by the wireless devices 102, 108, 110 and 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality.

Figure 2:
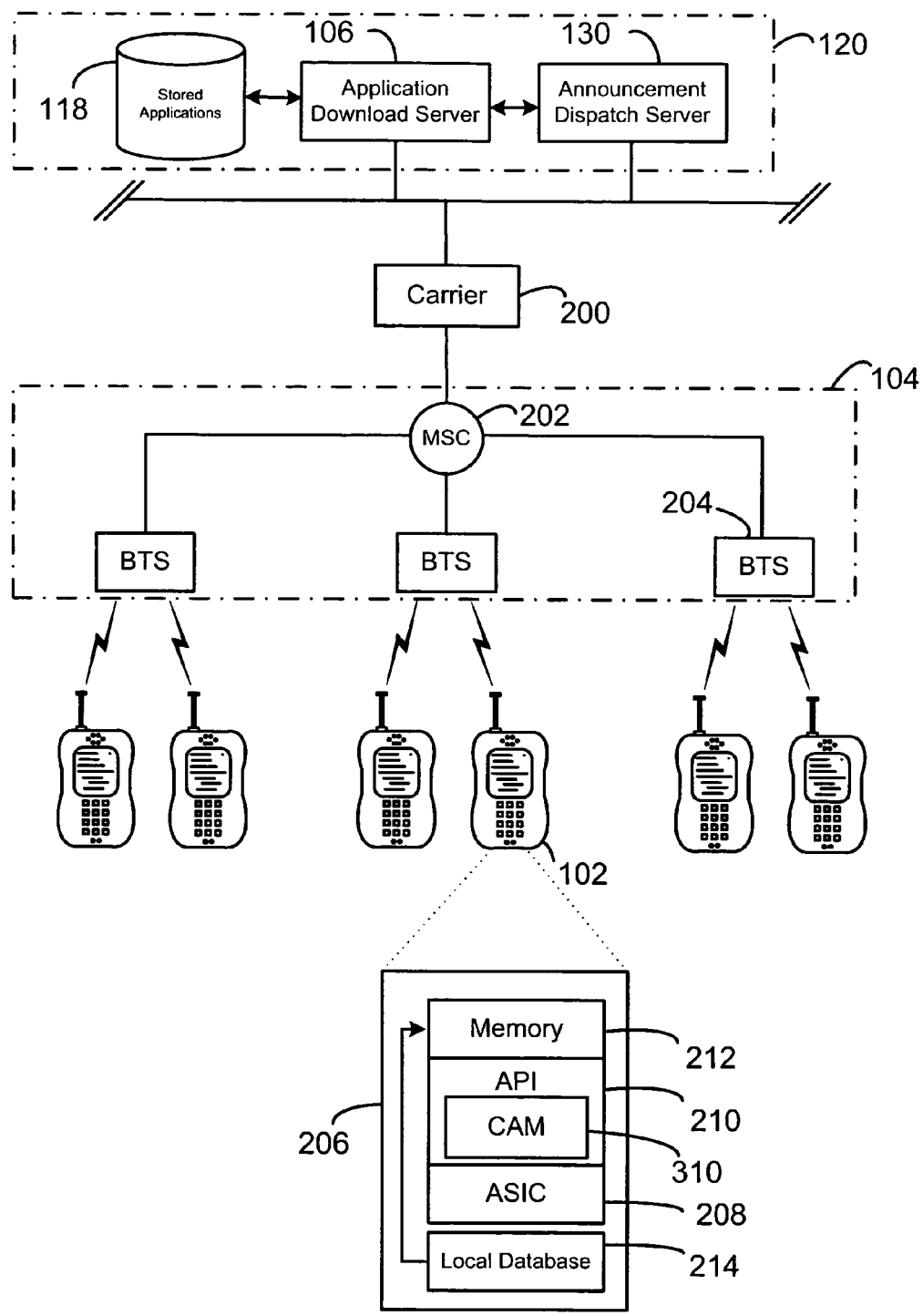
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and the interrelation of the elements of the exemplary embodiments of the invention. System 100 is merely exemplary and can include any system that allows remote client devices, such as wireless client computing devices 102, 108, 110 and 112 to communicate over-the-air between and among each other and/or between and among components connected via a wireless network 104, including, without limitation, wireless network carriers and/or servers. The application download server 106 and the stored application database 118, along with any other servers such as ad display server 130 which are used to provide cellular telecommunications services, communicate with a carrier network, through a data link, such as the Internet, a secure LAN, WAN, or other network. In the embodiment shown, a server 120 can include the application download server 106, ad dispatch server 130 and the stored application database 118. However, these servers can also be independent devices. The ad dispatch server 130 can provide additional ad services based on the configuration of each of the client devices 102, 108, 110 and 112.

The carrier network 200 controls messages (typically sent as data packets) sent to a messaging service controller (MSC) 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations (BTS) 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service (SMS), UDP datagrams, or other over-the-air (OTA) methods known in the art. The term "API-direct", "directed SMS" and "BREW-directed SMS" are used interchangeably in the following description to indicate an OTA message that includes coding to launch an application resident on the client device. Likewise, the terms "advertisement", "ad", "announcement", and "message" are used interchangeably to indicate information and/or instructions sent to a client device.

The client device, (here a wireless client computing device), such as a cellular telephone 102, has a computer platform 206 that can receive and execute software applications and/or commands transmitted form the application download server 106, ad dispatch server 130 and/or server 120. The computer platform 206 can include an application specific integrated circuit (ASIC) 208, or other processor, microprocessor, logic circuit, or other data processing device. The ASIC 208 or other processor executes the API 210 layer that interfaces with any resident programs in the memory 212 of the wireless device. The memory 212 can be comprised of read-only or random-access memory (RAM and ROM), EEPROM, flash cards, or any memory common to computer platforms. The API 210 also includes a Carrier Announcement Manager module (CAM) 310 containing logic configured to process special OTA (e.g., SMS) ads transmitted from the carrier network 200. The computer platform 206 also includes a local database 214 that can hold applications not actively used in memory 212. The local database 214 is typically a flash memory cell, but can be any secondary storage device as know to those skilled in the art, such as magnetic media, EPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications downloaded from the application download server 106. The software applications may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to ads communicated between a client device and a server. The client computing device can be serviced by at least one remote server with respect to at least such ads. Some examples of "wireless computing devices" which may be used in accordance with various embodiments of the present invention includes cellular telephones or other wireless communication units, PDAs, laptops, paging devices, navigation devices (e.g., GPS-based systems), handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Figure 3:
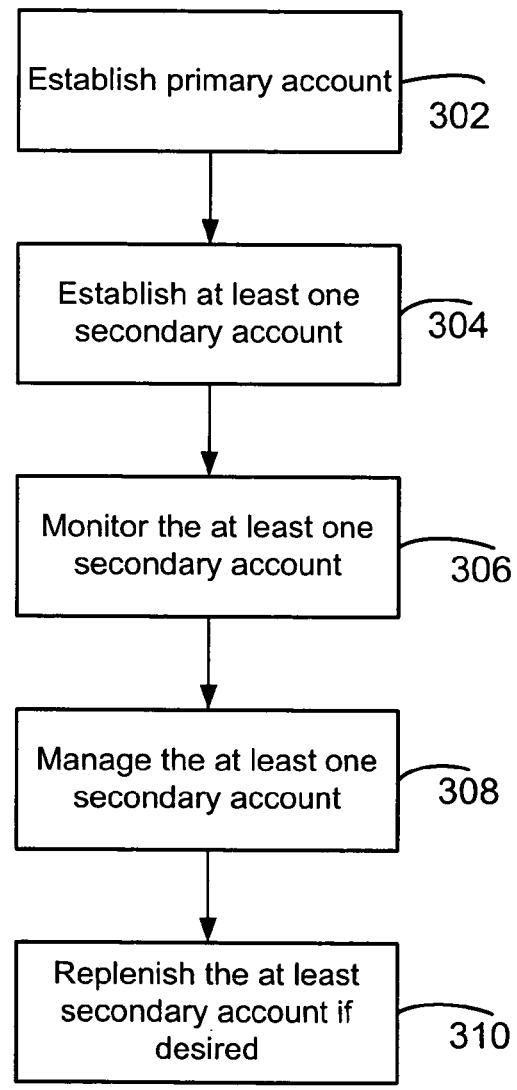
FIG. 3 is a diagram illustrating a prepay account method in accordance with at least one embodiment of the invention.

In FIG. 3, one exemplary embodiment of the usage of prepay accounts is illustrated. In this scenario, a plurality of functions are performed in a wireless communication system which includes a client device including a transceiver and logic configured to perform various functions. Those skilled in the art will appreciate that the various embodiments discussed may also be implemented in a non-wireless communication system (e.g. a landline telephone).

A primary account is established 302 for a particular user. For example, the primary account 302 may represent the monthly fees and charges associated with a user's mobile telephone account. In addition to the primary account 302, at least one secondary account 304 is also established and associated with the same user's primary account. In this particular example, the secondary account 304 may contain a prepay amount for the holder of the primary account to use for some other service (e.g. a game, data content subscription etc).

In an embodiment where data content delivery and usage predominates over voice telephony usage, those skilled in the art will appreciate that the primary account (e.g. telephony) may be established as the secondary account and the secondary account (e.g data services) may be established as a primary account, without departing from the spirit and scope of the present invention. The idea is that one account may be used and applied for one given service and another separate account may be used and applied for another separate service.

Charges against both the primary account and the secondary account are managed. For simplicity, FIG. 3 shows the management of the secondary account, but it will be understood that related account management techniques may be used in conjunction with the primary account. Charges that are being made against the secondary account 304 are monitored to ascertain how much of the account value has been used or expended and how much of the account value is remaining 306.

The user may then draw against the charges and monitor the prepay amount that is remaining in the secondary account 304. Once the funds in the secondary account have been exhausted, the user can no longer incur charges against the secondary account until further action is taken. One option is that the secondary account 308 may be replenished (if desired) at that point in time when there is no remaining value in the account or at some other time to increase the amount of prepay that is available or bring it up to a threshold value level. Another option is that the account may remain unfunded indefinitely, or until a future date that the secondary account will be replenished in total or in part.

The following example illustrates one exemplary implementation scenario. A parent may be paying the monthly phone charges in a primary account for a child to use and make calls on a particular mobile telephone that the child has been given the rights and privileges to use by the parent. The monthly phone charges are associated, grouped and managed as belonging to the primary account under an identifier [such as a subscriber identification (SID)] for that particular telephone and associated with the primary account.

As an example of a secondary account, the parent funds an additional $10 worth of prepaid charges in a secondary account that is associated with that SID and particular telephone for playing a particular Game X that the child has enjoyed playing in the past or expressed an interest in playing in the future. In other words, that particular child has $10 worth of charges to play Game X. Then, the child may play that game until the $10 limit has been attained. Subsequent game playing may occur only when additional funds are deposited into the secondary account.

In another example, the prepay amount in the account can be for the generic group of games in general and then the child can suballocate the prepay amount against a plurality of different games that are authorized or part of the accounts. Another example of a secondary account would be for $20 worth of multimedia clip downloads of sports, entertainment or educational content.

The concept is that there is a secondary account that is separate from the primary account and this secondary account can be used to fund additional charges for some other type of data service that is accessible on that particular wireless device.

In another example, the primary account is associated with the charges for a high speed data content delivery system (e.g., a high speed Internet connection). In this example, the secondary account would be a $20 subscription to a stock or commodity research service and news source with advanced charting functions.

Those skilled in the art will appreciate that different primary accounts can be set up with different permutations of secondary accounts and vice versa. Also, there can be a third, a fourth, fifth and so on accounts used in conjunction with the primary account without departing from the spirit and scope of the present invention as presented herein.

The use of multiple accounts allows third parties to fund the multiple accounts and introduce the user to different applications, data services and data content that they might otherwise not be exposed to. This both enriches the user ultimate experience and provides a vehicle for others (e.g. game developers) the ability to get a prospective user hooked on a particular game and generate future revenue streams from new product releases.

In another embodiment, the at least one primary account and the at least one secondary account are linked or related together and the respective account values in both accounts are managed in a predetermined way.

Figure 4:
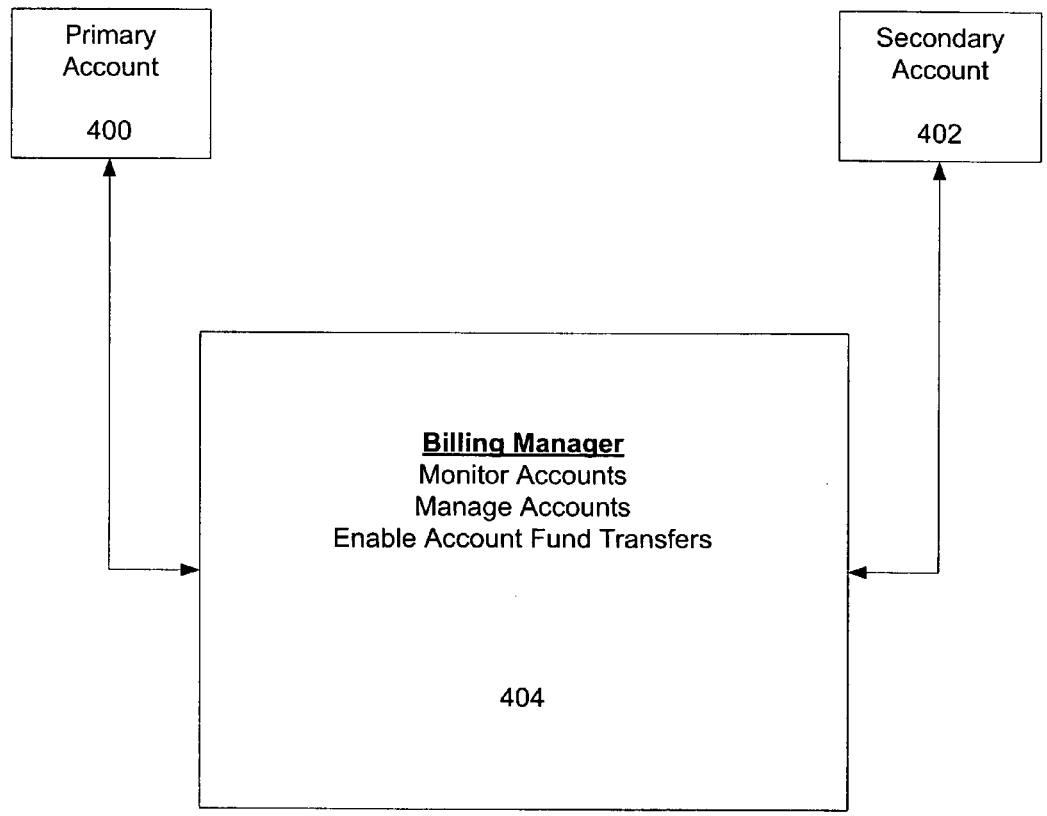
FIG. 4 is a diagram illustrating a billing manager managing a primary and a secondary account in accordance with at least one embodiment of the invention.

FIG. 4 is a diagram illustrating a billing manager 404 managing a primary 400 and a secondary account 402 in accordance with at least one embodiment of the invention. The billing manager 404 can perform many different operations relating to billing. For example, the billing manager 404 may monitor accounts, manage accounts and enable account fund transfers between the primary account 400 and the secondary account 402.

For example, let us say that the parent does not want to pay more than $100 total for the combined charges of the primary and secondary accounts. The parent allocates $60 per month in the primary account for telephone charges and $40 per month in the secondary account for game charges (for the $100 total referred to above). If the child demonstrates control and restraint regarding their phone usage and only spends $30 dollars per month in the primary account, the remaining $30 portion that was not used (or some portion thereof) in the primary account may be added or transferred to the $40 dollar amount funded in the secondary account for a total of $70 in the secondary account. The end result is that the $100 combined limit that the parent had established for both accounts has not been exceeded and all the parties involved in the transaction are happy.

Figure 5:
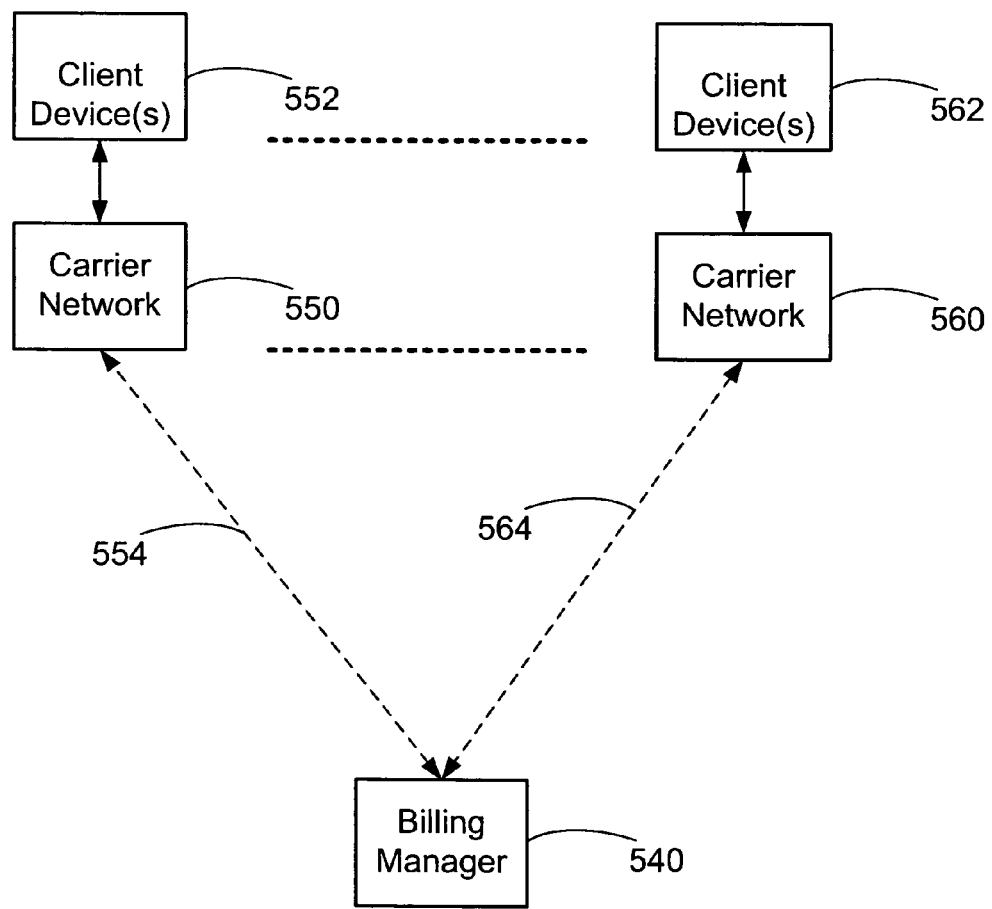
FIG. 5 is a diagram of a wireless network architecture illustrating a billing manager and client devices in accordance with at least one embodiment of the invention.

FIG. 5 is a diagram of a wireless network architecture illustrating a billing manager and client devices in accordance with at least one embodiment of the invention. A billing manager 540 is operably coupled to at least one server (not illustrated) capable of supporting billing operations. The configuration shown in FIG. 5 shows allows for a billing manager 540 to access different carrier networks 550, 560 and ultimately the different client devices 552, 562 in communication with each network. This enables a billing manager 540 to access multiple client devices (e.g., 552, 562) residing on multiple carrier networks (e.g., 550, 560). It should be understood that the billing manager operations may be performed in a central location (e.g. the billing manager) or the billing manager operations may be performed in a decentralized manner within each client device, or a combination of centralized and decentralized operations apportioned between the billing manager 540 and multiple client devices 552, 562.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary or tertiary media. The media may comprise, for example, RAM accessible by, or residing within, the client device and/or server. Whether contained in RAM, a diskette, or other secondary storage media, the instructions may be stored on a variety of machine-readable data storage media, such as direct access storage device (DASD) storage (e.g., a conventional "hard drive" or a RAID array), magnetic tape, electronic read-only media (e.g., ROM, or EEPROM), flash memory cards, an optical storage device (e.g. CD-ROM, WORM, DVD, digital optical tape), paper "punch" cards, or other suitable data storage media including digital and analog transmission media.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any peculiar order. Furthermore, although elements of the invention may be described in the singular, the plural is contemplated unless the limitation to the singular is explicitly stated.

What is claimed is:

1. A client device configured to manage a billing account comprising:
   a transceiver;
   logic configured to establish at least one primary account associated with a first type of service, wherein periodic fees charged to the billing account on a periodic basis include a first portion allocated to the at least one primary account; and
   logic configured to establish at least one secondary account associated with a second type of service, wherein the at least one secondary account represents an amount of prepaid service that is available for charging usage of the second type of service to the billing account, wherein the amount of prepaid service represented by the at least one secondary account is calculated by:
      adding a second portion of the periodic fees charged to the billing account on the periodic basis to the at least one secondary account as a prepaid service credit at the start of each of a set of billing periods; and
      deducting charges from the at least one secondary account based on the usage of the second type of service during the set of billing periods.

2. The client device of claim 1, further comprising:
   logic configured to process the periodic fees charged on a monthly basis.

3. The client device of claim 1, further comprising:
   logic configured to process the amount of prepaid service for an application.

4. The client device of claim 1, further comprising:
   logic configured to process the amount of prepaid service for a provided data content.

5. The client device of claim 1, further comprising:
   logic configured to link the at least one primary account and the at least one secondary account and to manage both a primary account value and a secondary account value in a predetermined way.

6. A method for billing prepay accounts comprising:
   establishing at least one primary account associated with a first type of service, wherein periodic fees charged to a billing account on a periodic basis include a first portion allocated to the at least one primary account; and
   establishing at least one secondary account associated with a second type of service, wherein the at least one secondary account represents an amount of prepaid service that is available for charging usage of the second type of service to the billing account, and wherein the amount of prepaid service represented by the at least one secondary account is calculated by:
      adding a second portion of the periodic fees charged to the billing account on the periodic basis to the at least one secondary account as a prepaid service credit at the start of each of a set of billing periods; and
      deducting charges from the at least one secondary account based on the usage of the second type of service during the set of billing periods.

7. The method of claim 6, wherein the periodic fees are charged on a monthly basis.

8. The method of claim 6, wherein the amount of prepaid service is for an application.

9. The method of claim 6, wherein the amount of prepaid service is for a provided content.

10. The method of claim 6, wherein the billing account is separate from the at least one primary account and the at least one secondary account.

11. The method of claim 6, wherein the establishing of the at least one primary account and the establishing of the at least one secondary account are performed by a client device.

12. The method of claim 6, wherein the establishing of the at least one primary account and the establishing of the at least one secondary account are performed by a server.

13. The method of claim 6,
   wherein the billing account is a unified billing account associated with voice and data cellular service for a particular user or group of users,
   wherein the first type of service associated with the at least one primary account is a cellular voice service and wherein the at least one primary account represents at least one periodic subscription fee for the cellular voice service, and
   wherein the second type of service associated with the at least one secondary account representing the amount of prepaid service is a cellular data service.

14. The method of claim 6,
   wherein the billing account is a unified billing account associated with voice and data cellular service for a particular user or group of users,
   wherein the first type of service associated with the at least one primary account is a cellular data service, and
   wherein the second type of service associated with the at least one secondary account representing the amount of prepaid service is a cellular voice service.

15. The method of claim 6, wherein an unused portion of the prepaid service credit added to the at least one secondary account in a current billing period is carried over to a next billing period at the end of the current billing period whereby the amount of prepaid service represented by the at least one secondary account for the next billing period is calculated by adding the unused portion of the prepaid service credit from the current billing period to the second portion of the periodic fees that are added to the at least one secondary account as the prepaid service credit at the start of the next billing period.

16. The method of claim 15, wherein the at least one primary account includes the periodic fees and also one or more fees based on usage of the first type of service.

17. The method of claim 16, wherein the amount of prepaid service represented by the at least one secondary account is further calculated by adding an unused portion of the one or more fees based on the usage of the first type of service to the amount of prepaid service represented by the at least one secondary account at the end of each of the set of billing periods.

18. The method of claim 16, further comprising:
   replenishing the at least one secondary account to increase the amount of prepaid service represented by the at least one secondary account to a threshold value level in response to determining that the charges deducted from the at least one secondary account based on the usage of the second type of service has exhausted the amount of prepaid service available for charging the usage of the second type of service to the billing account.

19. A client device, comprising:
   a transceiver;
   a user interface; and
   a billing manager, configured to perform operations within the client device, for managing at least one primary account and at least one secondary account, the at least one primary account associated with a first type of service, wherein periodic fees charged to a billing account on a periodic basis include a first portion allocated to the at least one primary account, and the at least one secondary account representing an amount of prepaid service that is available for charging usage of a second type of service to the billing account, wherein the amount of prepaid service represented by the at least one secondary account is calculated by:
- adding a second portion of the periodic fees charged to the billing account on the periodic basis to the at least one secondary account as a prepaid service credit at the start of each of a set of billing periods; and
- deducting charges from the at least one secondary account based on the usage of the second type of service during the set of billing periods.

20. The client device of claim 19, wherein the client device is at least one of a wireless computing device, a wireless telephone, a laptop, a cellular telephone, a personal digital assistant (PDA), and a paging device.

21. A non-transitory computer-readable storage medium including instructions encoded thereon, which, when executed by a computing device, cause the computing device to perform operations related to management of a billing account, the operations including:
- establishing at least one primary account associated with a first type of service, wherein periodic fees charged to the billing account on a periodic basis include a first portion allocated to the at least one primary account; and
- establishing at least one secondary account associated with a second type of service, wherein the at least one secondary account represents an amount of prepaid service that is available for charging usage of the second type of service to the billing account, wherein the amount of prepaid service represented by the at least one secondary account is calculated by:
  - adding a second portion of the periodic fees charged to the billing account on the periodic basis to the at least one secondary account as a prepaid service credit at the start of each of a set of billing periods; and
  - deducting charges from the at least one secondary account based on the usage of the second type of service during the set of billing periods.

22. The non-transitory computer-readable storage medium of claim 21, further comprising processing the periodic fees that are charged on a monthly basis.

23. The non-transitory computer-readable storage medium of claim 21, further comprising processing the amount of prepaid service for an application.

24. The non-transitory computer-readable storage medium of claim 21, further comprising linking the at least one primary account and the at least one secondary account and managing both a primary account value and a secondary account value in a predetermined way.

25. The non-transitory computer-readable storage medium of claim 21, wherein the computing device corresponds to a client device.

26. The non-transitory computer-readable storage medium of claim 21, wherein the computing device corresponds to a server.

27. A server for enabling a billing account comprising:
- means for establishing at least one primary account associated with a first type of service, wherein periodic fees charged to the billing account on a periodic basis include a first portion allocated to the at least one primary account; and
- means for establishing at least one secondary account associated with a second type of service, wherein the at least one secondary account represents an amount of prepaid service that is available for charging usage of the second type of service to the billing account, wherein the amount of prepaid service represented by the at least one secondary account is calculated by:
  - adding a second portion of the periodic fees charged to the billing account on the periodic basis to the at least one secondary account as a prepaid service credit at the start of each of a set of billing periods; and
  - deducting charges from the at least one secondary account based on the usage of the second type of service during the set of billing periods.

28. The server of claim 27, further comprising means for processing the periodic fees that are charged on a monthly basis.

29. The server of claim 27, further comprising means for processing the amount of prepaid service for an application.

30. The server of claim 27, further comprising means for linking the at least one primary account and the at least one secondary account and means for managing both a primary account value and a secondary account value in a predetermined way.

31. A client device configured to manage a billing account comprising:
- means for establishing at least one primary account associated with a first type of service, wherein periodic fees charged to the billing account on a periodic basis include a first portion allocated to the at least one primary account; and
- means for establishing at least one secondary account associated with a second type of service, wherein the at least one secondary account represents an amount of prepaid service that is available for charging usage of the second type of service to the billing account, wherein the amount of prepaid service represented by the at least one secondary account is calculated by:
  - adding a second portion of the periodic fees charged to the billing account on the periodic basis to the at least one secondary account as a prepaid service credit at the start of each of a set of billing periods; and
  - deducting charges from the at least one secondary account based on the usage of the second type of service during the set of billing periods.

32. A server for enabling a billing account comprising:
- logic configured to establish at least one primary account associated with a first type of service, wherein periodic fees charged to the billing account on a periodic basis include a first portion allocated to the at least one primary account; and
- logic configured to establish at least one secondary account associated with a second type of service, wherein the at least one secondary account represents an amount of prepaid service that is available for charging usage of the second type of service to the billing account, wherein the amount of prepaid service represented by the at least one secondary account is calculated by:
  - adding a second portion of the periodic fees charged to the billing account on the periodic basis to the at least one secondary account as a prepaid service credit at the start of each of a set of billing periods; and
  - deducting charges from the at least one secondary account based on the usage of the second type of service during the set of billing periods.

* * * * *